United States Patent
Kobori et al.

(10) Patent No.: US 7,165,844 B2
(45) Date of Patent: Jan. 23, 2007

(54) PROJECTOR TYPE DISPLAY APPARATUS

(75) Inventors: Tomoki Kobori, Kamakura (JP); Fumio Haruna, Yokohama (JP); Tsuneyuki Nozawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/491,224

(22) Filed: Jul. 24, 2006

(65) Prior Publication Data

US 2006/0256294 A1    Nov. 16, 2006

Related U.S. Application Data

(63) Continuation of application No. 11/218,789, filed on Sep. 6, 2005, now Pat. No. 7,090,352, which is a continuation of application No. 10/619,168, filed on Jul. 15, 2003, now Pat. No. 6,945,653.

(30) Foreign Application Priority Data

Feb. 21, 2003    (JP)    ............... 2003-043536

(51) Int. Cl.
- G03B 23/02    (2006.01)
- G03B 21/26    (2006.01)
- G06K 9/46    (2006.01)
- G09G 5/00    (2006.01)
- G02B 27/20    (2006.01)
- G03H 1/02    (2006.01)

(52) U.S. Cl. ............... 353/30; 353/69; 353/25; 353/122; 382/291; 382/203; 345/2.2; 362/259; 362/800; 359/27

(58) Field of Classification Search ............... 353/69, 353/25, 30, 122; 382/291, 181, 190, 203, 382/292; 345/2.2, 156; 362/259, 800; 359/27
See application file for complete search history.

(56) References Cited

U.S. PATENT DOCUMENTS

| | | | | |
|---|---|---|---|---|
| 5,574,511 A | * | 11/1996 | Yang et al. | 348/586 |
| 5,923,380 A | * | 7/1999 | Yang et al. | 348/586 |
| 6,259,470 B1 | * | 7/2001 | Koizumi et al. | 348/14.1 |
| 6,339,748 B1 | | 1/2002 | Hiramatsu | |
| 6,361,173 B1 | * | 3/2002 | Vlahos et al. | 353/97 |

(Continued)

FOREIGN PATENT DOCUMENTS

EP    0 947 948 A2    6/1999

(Continued)

*Primary Examiner*—W. B. Perkey
*Assistant Examiner*—Magda Cruz
(74) *Attorney, Agent, or Firm*—McDermott Will & Emery LLP

(57) ABSTRACT

There is provided a safe image display apparatus for projecting an image on a screen that can minimize a stimulus to eyes, retinae and optic nerves from projected light entering into the eyes directly. By comparing a displayed image captured by a camera with an input image signal, a changed area is detected as a difference area and, then, a projected image signal is generated wherein a picture area image signal in the input image signal that corresponds to this difference area is masked by a black signal. The obtained projected image signal is projected onto the screen.

20 Claims, 7 Drawing Sheets

U.S. PATENT DOCUMENTS

| | | | |
|---|---|---|---|
| 6,454,415 B1 * | 9/2002 | Vlahos | 353/30 |
| 6,512,507 B1 | 1/2003 | Furihata et al. | |
| 6,796,656 B1 * | 9/2004 | Dadourian | 353/28 |
| 6,798,926 B1 | 9/2004 | Hiramatsu | |
| 6,829,394 B1 | 12/2004 | Hiramatsu | |
| 2004/0070694 A1 | 4/2004 | Haruna et al. | |

FOREIGN PATENT DOCUMENTS

| | | |
|---|---|---|
| EP | 1 089 119 A1 | 4/2001 |
| JP | 2994469 | 10/1999 |
| JP | 2000-305481 A | 11/2000 |
| JP | 2000305481 A | 11/2000 |

* cited by examiner

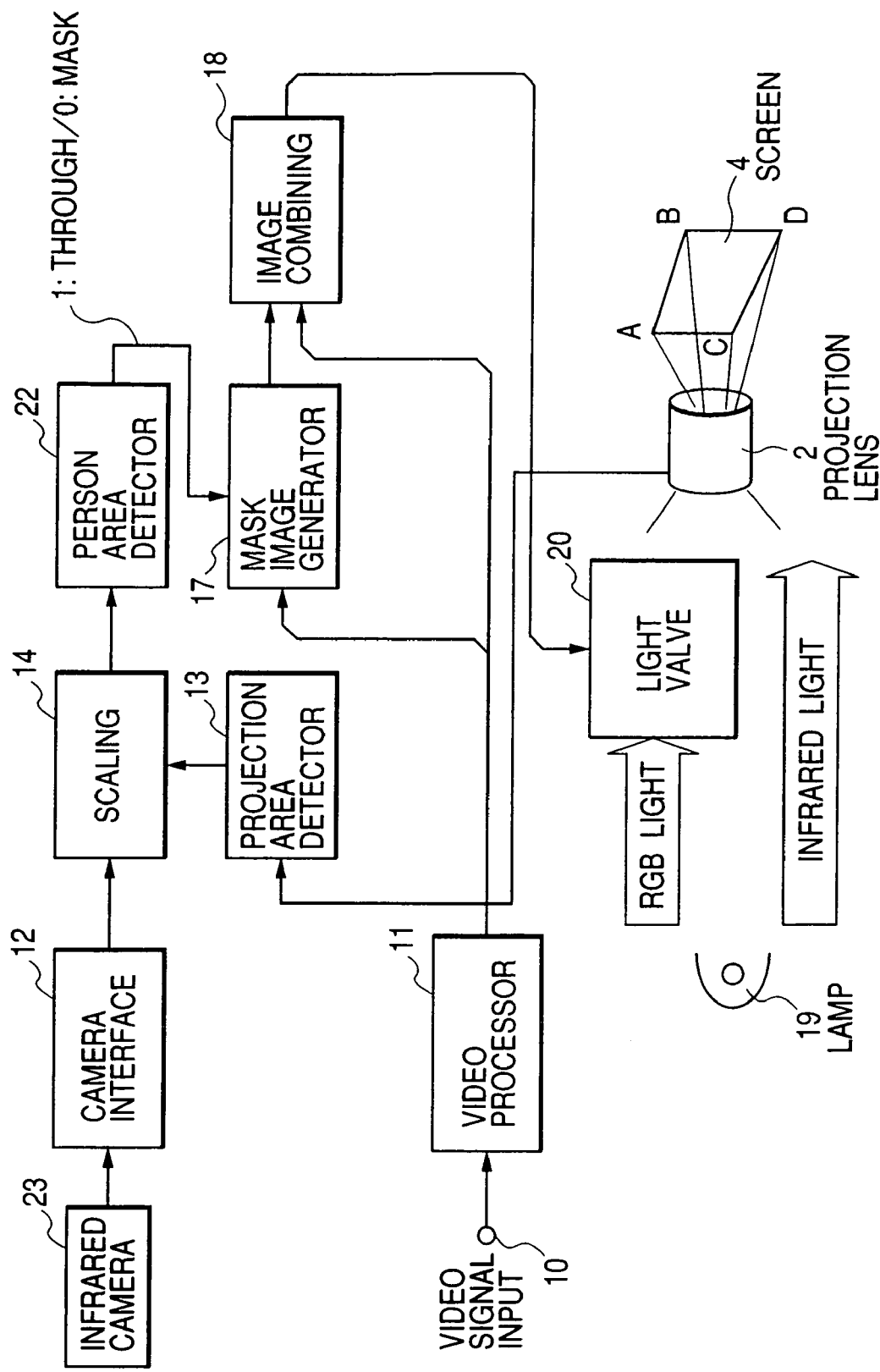

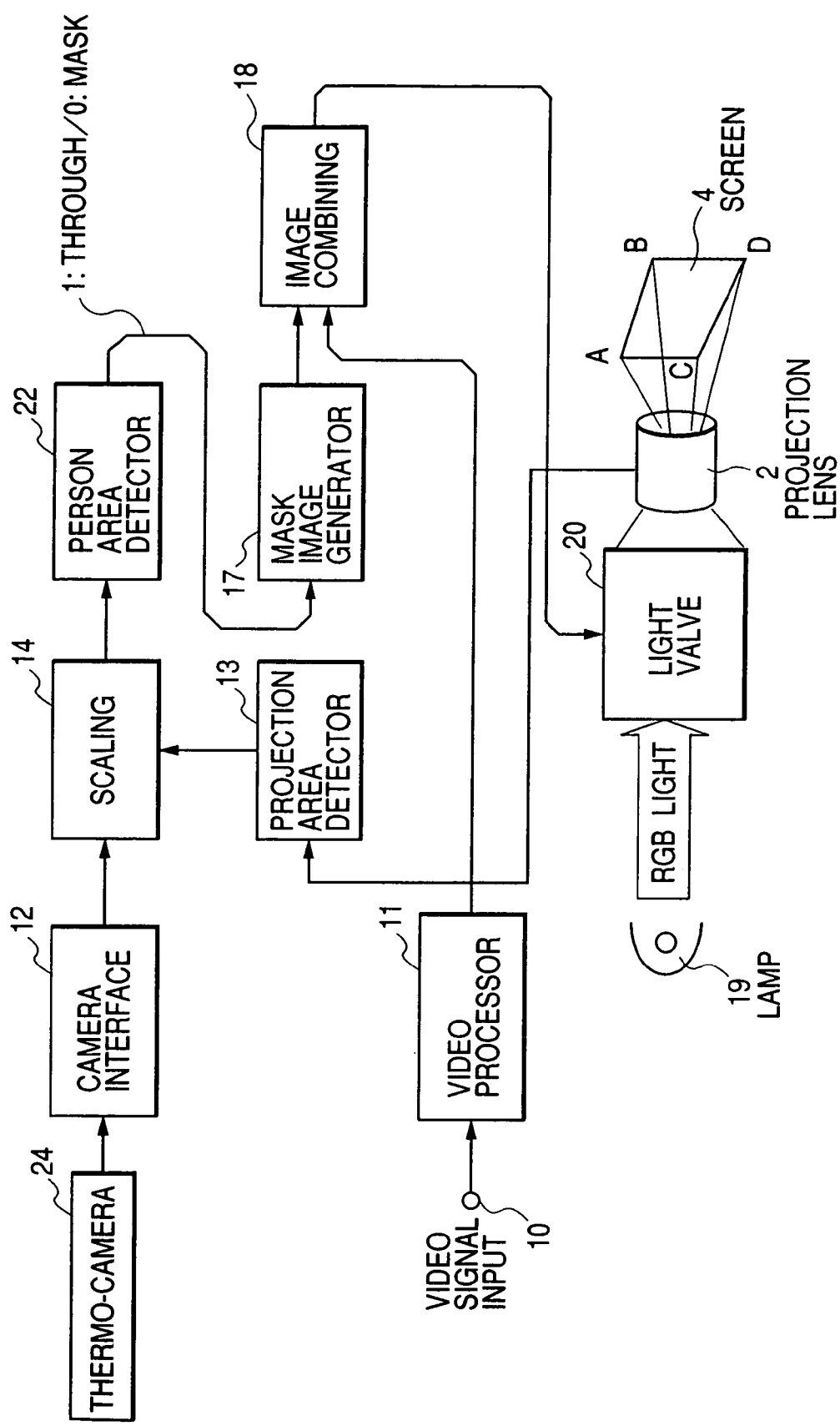

CAPTURE IMAGE

INPUT VIDEO IMAGE

SCALING IMAGE

PICKUP IMAGE OF SHOOTING AREA

MASK IMAGE

SHOOTING AREA

OUT OF PROJECTION AREA IMAGE

CAPTURE IMAGE

INPUT VIDEO IMAGE

SCALING IMAGE

PROJECTOR TYPE DISPLAY APPARATUS

RELATED APPLICATIONS

This application is a continuation of Ser. No. 11/218,789, filed Sep. 6, 2005 now U.S. Pat. No. 7,090,352, which is a continuation of Ser. No. 10/619,168, filed Jul. 15, 2003, now U.S. Pat. No. 6,945,653, which claims priority of Japanese Patent application No. 2003-043536, filed Feb. 21, 2003, and the contents of which are herewith incorporated by reference.

BACKGROUND OF THE INVENTION

The present invention relates to a safety improvement technique in a projector type image display apparatus that is configured to display visual information by projecting it on a screen.

In a conventional liquid crystal projector that is configured to project an image on a screen in front of the projector, as there is a risk in that eyes of a speaker or other persons on the platform are stimulated by strong light when the persons enter into the path of the light projected from the projector to the screen and look toward the projector, such risk must be prevented by indicating precautions on the main body of the projector and so on.

Further, as described in Japanese Patent Laid-open No. 2000-305481 and Japanese Patent No. 2994469, there has been proposed a method for preventing such risk by providing detection means for detecting whether there is an object in a projection path and control means for controlling an amount of light from a projection lens, wherein light intensity from the projection lens is reduced when the object is detected.

SUMMARY OF THE INVENTION

However, in the conventional displaying method for alarming the risk, it may still be likely that any person enters into the projection path and such risk can be accommodated merely by calling for further attention.

On the other hand, in the patent document 1, there is a problem in that the light intensity of the image in the vertical direction including the person is reduced because the area of the person entering into the projection path is detected and, in the patent document 2, in turn, there is a problem in that, when the person area is extracted and then masked by using various sensors such as, in particular, a CCD sensor, person extraction accuracy may be degraded and, therefore, false detection may occur due to insufficient exposure of the CCD.

In view of the above problems, it is an object of the present invention to provide an image display apparatus that can reduce glare by reducing projected light entering into eyes while keeping a picture projected on a screen during a presentation using the projected image by a speaker on the platform even when (1) someone enters into the projection path accidentally, (2) the speaker standing in the projection path turns his/her face to the projector, or (3) a picture is displayed in an enlarged manner or trapezoidal distortion is compensated because of setting of the projector and the screen.

In order to solve the above problems, according to the present invention, there is provided a projector type display apparatus for applying light from a light source to a picture display device (a light valve) and projecting outgoing light from said picture display device onto a screen in an enlarged manner having: display device control means for controlling said picture display device based on an input image signal; a camera for capturing an image projected on said screen; detection means for detecting an area projected on said screen; image size control means for changing the captured image from said camera into a predetermined image size; and means for extracting a person area in said captured image the size of which is changed by said image size control means; wherein said display device control means controls so that an area on said image display device corresponding to said person area is substituted by predetermined data.

BRIEF DESCRIPTION OF THE DRAWINGS

FIG. 4 is a diagram showing a third embodiment of an image display apparatus according to the present invention;

FIG. 5 is a diagram showing a fourth embodiment of an image display apparatus according to the present invention;

DETAILED DESCRIPTION OF THE PREFERRED EMBODIMENTS

Hereinafter, embodiments of the present invention will be described with reference to the drawings.

Figure 1:
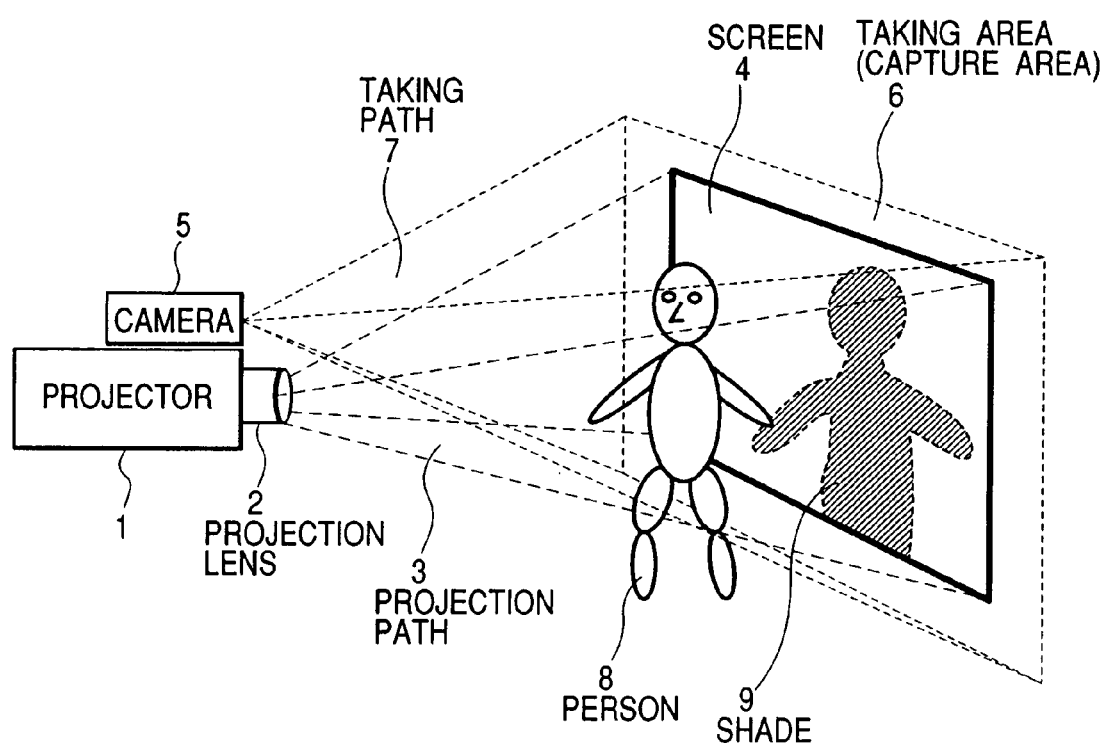
FIG. 1 is a diagram showing an exemplary system configuration to which the present invention is applied.
Figure 2:
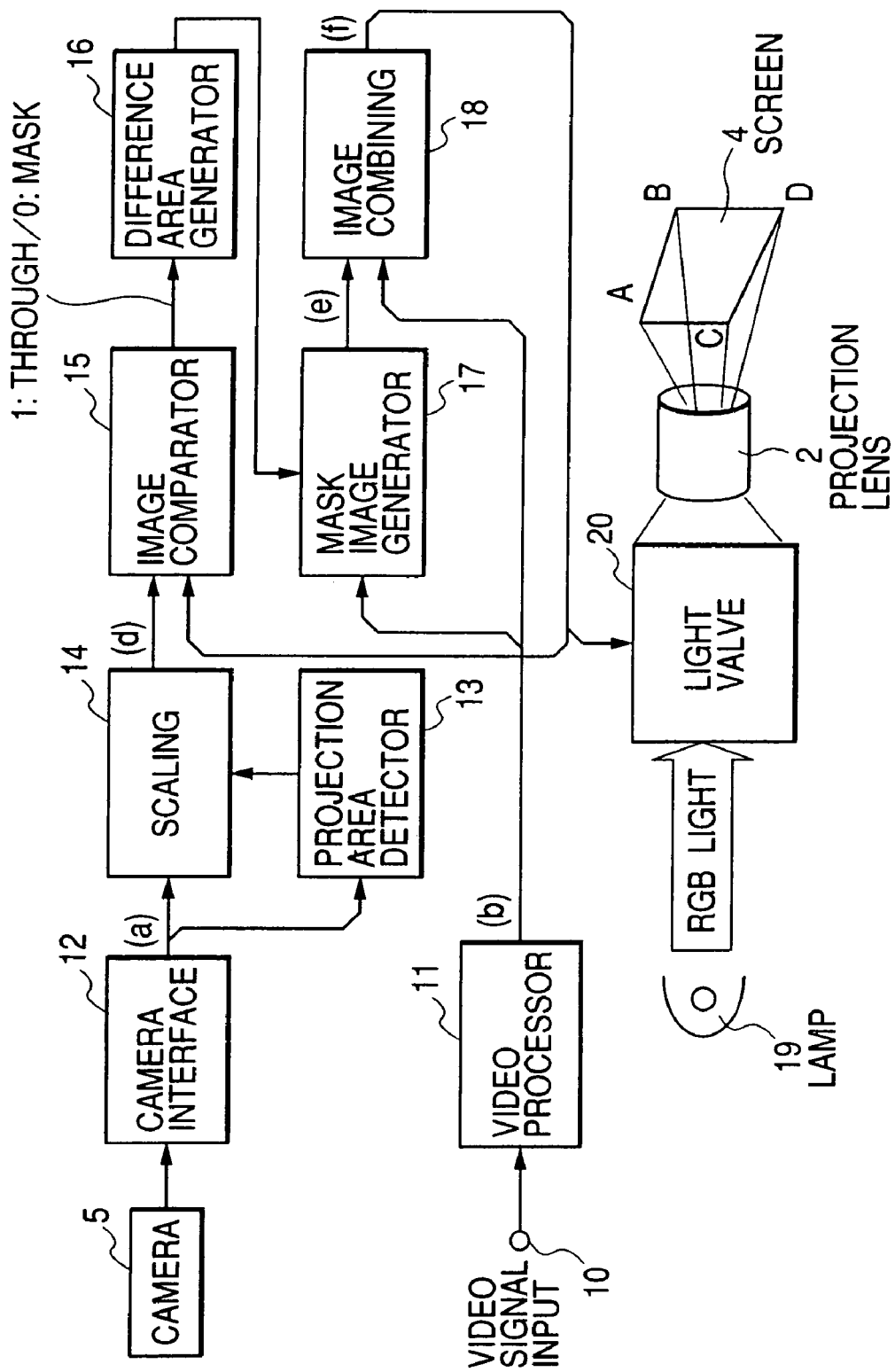
FIG. 2 is a diagram showing a first embodiment of an image display apparatus according to the present invention.

FIG. 1 is a schematic diagram showing an exemplary system configuration in which a front projection type projector apparatus according to the present invention, a screen and a speaker on the platform are disposed. Further, FIG. 2 is a block diagram showing a first embodiment of an image processing unit according to the present invention. Still further, FIGS. 6A–6G are schematic diagrams showing image information in each processing block.

Here, an embodiment using a light valve type display device that controls an amount of light transmitted by a liquid crystal or reflected by a reflecting mirror according to a gray-scale level of each pixel in image information will be described. The display device is not limited to a particular type and it may be any display device such as a three-pipe type or a CRT type. Further, though the case in which one image display device as shown in FIG. 2 is included is described, the present invention may also be applied to the case in which the image display device is comprised of separate display panels for each of the RGB signals similarly.

Further, though the display panel of XGA (1024×768× RGB) resolution and the camera of SXGA (1280×1024× RGB) resolution are assumed in the following description for the sake of simplicity, the display panel and/or the camera of other resolution or a plurality of the display panels and/or the cameras may be used similarly, of course. The camera of either a CCD type or a CMOS type may be used similarly. Here, it is assumed that an image frame frequency Fv is, for example, 60 Hz (T1= about 16.67 msec., frame numbers f0, f1, f2, f3, . . . ) in the following description.

In FIG. 1, there are shown a front projection type projector 1, a projection lens 2, a projection path 3, a screen 4, a camera 5, a capture area 6 by the camera 5, a taking path 7, a person (a speaker on the platform) 8, and a shade 9 of the speaker on the platform. Further, FIG. 2 shows a first embodiment of an image display unit in the projector 1, wherein there are shown a video signal input 10, a video processor 11, a camera interface 12, a projection area detector 13, a scaling unit (image size change unit) 14, an image comparator 15, a difference area generator 16, a mask image generator 17, an image signal combining unit 18, a lamp (light source) 19, and a light valve (image display device) 20. FIGS. 6A–6G are diagrams for schematically showing image information in each image processing section.

Figure 7A:
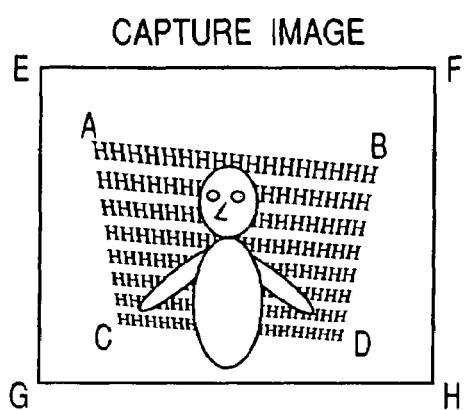
FIGS. 7A–7C are diagrams for schematically showing image information in each image processing section in the embodiments of the present invention.
Figure 7B:
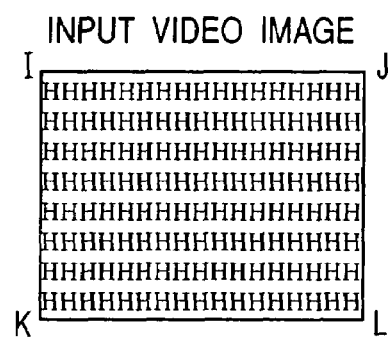

Light is projected from the projection lens 2 through the projection path 3 onto the screen 4 to reproduce the projected image. The camera 5 obtains captured image information taken in a capture area enclosing the projected light area through the taking path 7. Here, when the projection lens 2 and the camera 5 are disposed in positions close to each other, the projection path and the taking path substantially agree with each other and, therefore, a distortion of the captured image substantially agrees with a distortion of the image seen through the projection lens. Of course, these distortions may not always agree with each other when the projection lens 2 is apart from the camera 5, lenses of different properties are used, or the projected position is changed by adjusting the position where the projection lens 2 is disposed. For example, the captured image may be as shown in FIG. 7A. Even in such case, according to the present invention, the person area can be extracted properly by an image scaling process in the scaling unit 14 as described below.

When the person 8 enters into the projection path 3, the person 8 intercepts the projected image and appears as the shade 9 on the screen. On the other hand, the camera 5 captures the projected image including the person 8 entering into the taking path 7. Here, it is to be noted that the shade 9 is not captured as discussed above.

Next, a processing operation in the projector 1 will be described in detail. First, the video processor 11 generates displayed image information (FIG. 6B) obtained by processing input image information from the video signal input 10 so that the input image information conforms to the display format of the light valve 20. For example, the input image as shown in FIG. 6B is processed to be in XGA size and pixels located at each corner of the image are designated as I, J, K and L, respectively.

Further, though R, G and B are processed identically in this embodiment, R, G and B may be processed separately or complementary color signals may be used, of course, without departing from the present invention.

Figure 6A:
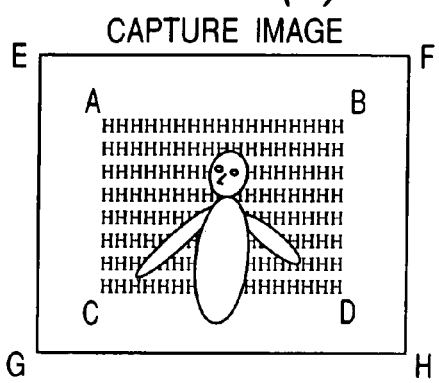
FIGS. 6A–6G are diagrams for schematically showing image information in each image processing section in the embodiments of the present invention.
Figure 6B:
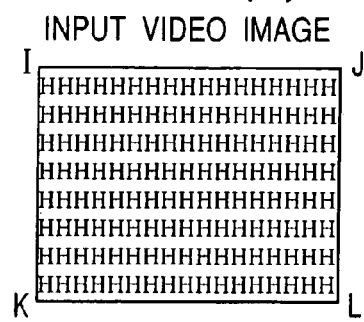

When each of R, G and B light is incident on the light valve 20, the light having the intensity according to a gray-scale level of the projected image information determined by FIG. 6B per every pixel is transmitted or reflected and, then, the outgoing light is projected on the screen 4 through the projection lens in an enlarged manner. This is a typical configuration used in liquid crystal projectors and, therefore, its detailed description is omitted.

On the other hand, the camera 5 obtains the captured image as shown in FIG. 6A. Here, pixels located at each corner of the captured image of SXGA size that is the camera's resolution are designated as E, F, G and H, respectively, and pixels located at each corner of the area where the projected image are indicated inside the captured image are designated as A, B, C and D, respectively.

The camera interface 12 corrects the captured image for properties of each camera, adjusts the color balance, the hue and the like of the captured image and outputs the captured image information (FIG. 6A). The projection area detector 13 considers the captured image information and generates area information by determining the area in which the projected image is included. Here, the determination method described here is not intended to limit the present invention in any way and the determination may be performed by comparing the captured image with an adjacent image or former image information. Further, the determination may be performed according to the properties of the projection lens 2 and the camera 5 or the area of the captured image may be defined in advance according to the magnification of the projection lens 2 and the like. Still further, the area information may be fixed by changing the magnification of the capture lens of the camera 5 according to the magnification of the projection lens 2 or, alternatively, the area information may be specified from outside.

Figure 6C:
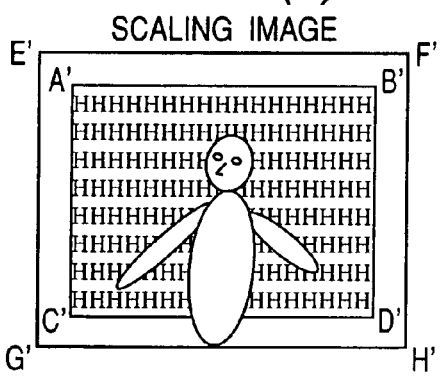
Figure 6D:
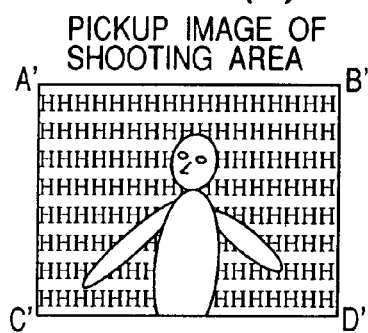

The scaling unit 14 performs a scaling (enlargement or reduction) process of the captured image information according to the area information so that the positions of the pixels A, B, C and D agree with the positions of the pixels A', B', C' and D' and outputs it as displayed area extraction image (FIG. 6D). More specifically, the captured image as shown in FIG. 6A is turned into the scaling image as shown in FIG. 6C. Then, as shown in FIG. 6D, only the image of the projected area is extracted from the scaling image as the displayed area extraction image.

Here, an area disposed between the pixel positions E', F', G' and H' corresponding to SXGA size and the pixel positions A', B', C' and D' is defined as the out of projected area image. Here, horizontal or vertical trapezoidal correction may be performed as the scaling process so as to improve flexibility in disposing the projection lens 2 and the camera 5.

The image comparator 15 generates disagreement information by comparing the image information of the displayed area extraction image with the information of the projected combined image per every pixel. In this case, the disagreement information may be generated by feature comparison in information average values of surrounding pixels, feature comparison in information variation between pixels, or from information about the person's motion by comparison between frames. This disagreement information is, for example, defined as 1 in the area where the agreement is found and 0 in the area where the disagreement is found.

On the other hand, an amount of compensation and adjustment of the camera interface 12 may be determined according to the comparison result so as to improve comparison accuracy. Further, the pixels to be compared may be thinned out. Still further, in addition to the person area, facial information may also be distinguished. Here, the area determination method described above is not intended to limit the present invention in any way and any known method may be used.

Next, the difference area generator 16 generates differential area information when it is determined that there is the person in the area on the screen including the disagreeing pixels based on the disagreement information. Here, the entire person area, the face area, the eye area, an area of a particular shape and the like may be selected as the differential area. Further, former differential area information may be held every frame period Fv and, then, new differential area information may be generated by using the former, differential area information and, further, the shape of the differential area may be fixed according to the former information and, then, a new differential area may be generated by area movement.

Figure 6E:

The mask image generator 17 generates masked image information (FIG. 6E) by reducing the gray-scale level of the pixels indicated by the differential area information in the displayed image information or replacing such pixels by either a particular color having a low gray-scale level or black. The masked image information may be any image that is less stimulating visually such as an image in which the pixels in the disagreement area is replaced by black signals or gray-scale signals of a predetermined level as shown in FIG. 6E and the masked image information is not limited to any particular form.

Figure 6F:
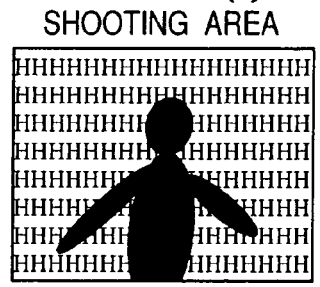

The image signal combining unit 18 superimposes the masked image information on the displayed image information to generate projection image (FIG. 6F).

Figure 6G:
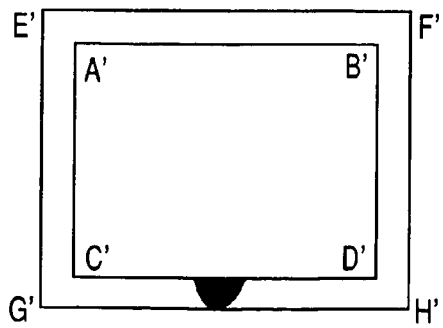

Further, the image comparator 15 detects an area in which changes between frames can be found by information comparison or a motion area by using the image information out of the projected area in the captured image information shown in FIG. 6G. Here, such area may be determined as the person area and the shape of the differential area may be corrected by using this person area. Further, the entry into the projection path 3 may be detected in advance by comparison with the former frame.

Figure 7C:
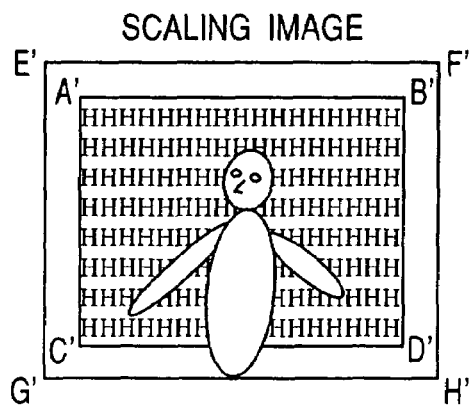

Here, even when the images are distorted unevenly because the projection lens 2 is apart from the camera 5 or each of these has different lens properties, for example, in the case of the captured image shown in FIG. 7A, it goes without saying that the process described above may be possible by performing the trapezoidal correction in the scaling unit 14 to generate the image shown in FIG. 7C.

According to the first embodiment described above, when any object enters into the projection path, it is possible to reduce the intensity of the light projected on the object only. Further, when the person entering into the projection path is the speaker on the platform, as the image is projected on the screen normally, the action of the speaker using the screen may not be interrupted and the speaker can watch the state of an audience sitting at the side of the projector easily. It can implement a presentation environment that is comfortable and impressive.

Further, according to the first embodiment, even when the image is displayed in an enlarged manner by the projector or the trapezoidal distortion in the displayed image is corrected, it is also possible to shade the area projected onto the speaker on the platform.

Still further, according to the first embodiment, by displaying a background image by the projector, a new application such as to improve a visual effect centering around a person can be implemented.

Next, a second embodiment of the present invention will be described with reference to FIG. 3. Here, elements having reference numerals identical to those described in the first embodiment have substantially similar features, description of which will be, therefore, omitted.

Figure 3:
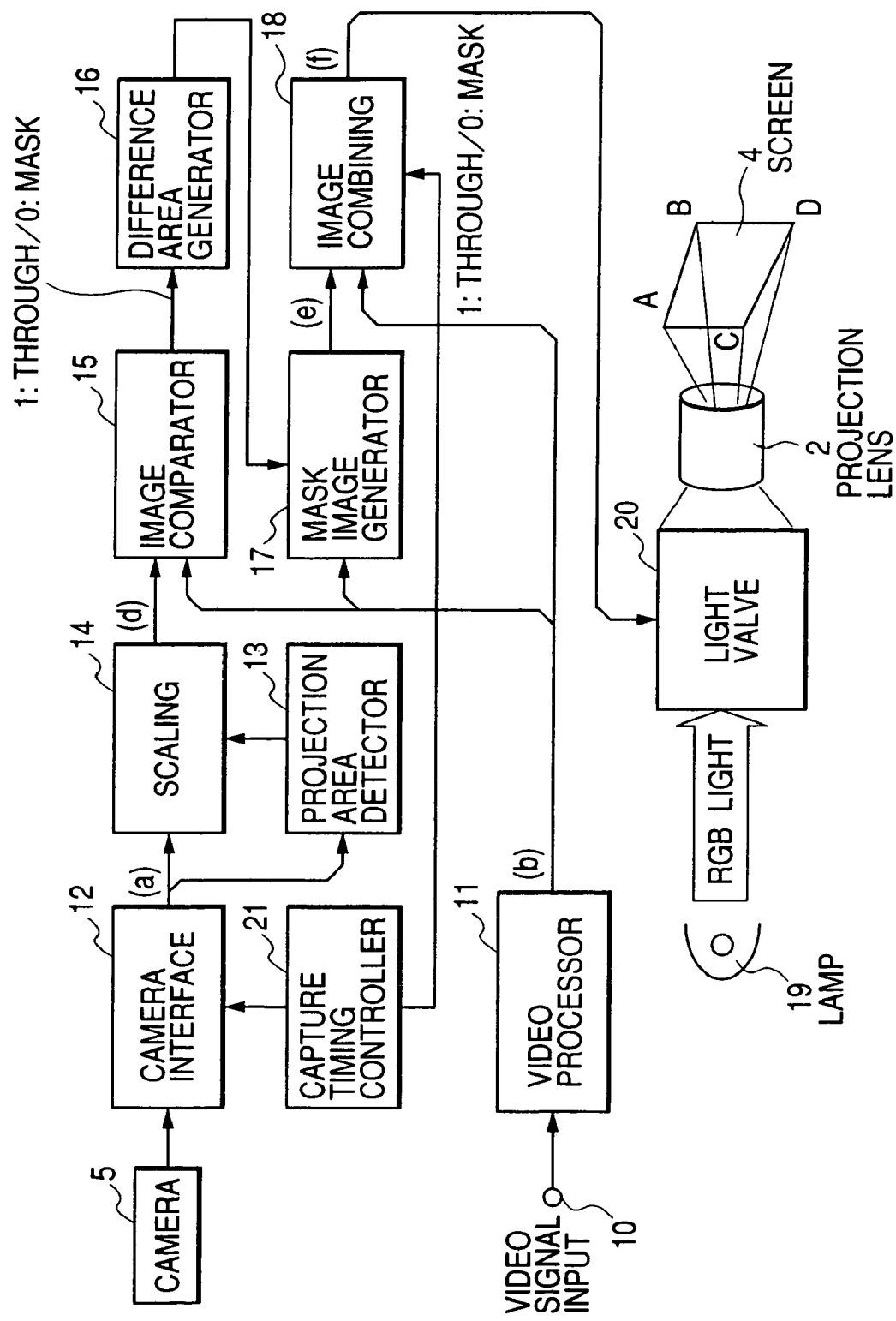
FIG. 3 is a diagram showing a second embodiment of an image display apparatus according to the present invention.

FIG. 3 shows a configuration in which a capture timing controller 21 is added to the configuration in FIG. 2.

According to this configuration, the capture timing controller 21 counts a frame synchronization signal Fv and permits to capture an image only during one frame period in N frame periods, wherein the number of N is either fixed or settable, for example, N=60. The camera interface 12 captures the image from the camera 5 during the frame period when the capture is permitted by a capture permission signal (for example, it is labeled as 1 when the capture is permitted and 0 when the capture is held) and the capture is stopped during the frame period when the capture is prohibited.

In this case, a former captured image may be retained in the frame period when the capture is prohibited. Further, the frame period when the capture is permitted may be further time-divided.

Here, the value of N such as N=60, 125, 250 and so on may be selected based on a camera shutter speed (for example, 1/60, 1/125, 1/250 and so on) and, further, the frame period when the capture is permitted may be time-divided into 125/60 (250/60) so that it becomes equivalent to N=125 (250).

On the other hand, a similar control signal (for example, it is labeled as 1 when the image is unchanged and 0 when the image is masked) is also supplied to the image signal combining unit 18 so that the displayed image is selected to be projected during the frame period when the capture is permitted (when the image is unchanged). Further, during the frame period when the capture is prohibited (when the image is masked), an image on which the masked image is superimposed is selected. In this case, the displayed image may be projected in a shorter period that is defined by further time-dividing the frame period when the capture is permitted.

At this time, the image comparator 15 is configured to compare the displayed area extraction image from the scaling unit 14 with the displayed image from the video processor 11.

Further, lighting time of a flash lamp used for the capture by the camera may be set to a value on the order of one several thousandths seconds.

Here, it is to be noted that a laser radiation safety standard is defined by the IEC 60825-1 standard or, in Japan, by the JIS C6802 (a radiation safety standard for laser products). For example, a laser pointer having an output not more than 1 mW He—Ne (Helium-Neon) regardless of a laser diameter or a single pulse (a pulse width of $10^{-7}$ s.) visible laser having an output not more than 3 W is defined as a reference level at which retinae are not damaged even when the eyes are exposed to the laser light during a nictitation or for 0.25 s. or safety is assured even when any supplementary optical system such as binoculars is used at the worst.

Though the frame period N and the amount of emitted light are not specified clearly in the above description of this embodiment, these values may be determined according to how the person standing in the projection path suffers glare and, at the same time, according to the standards described above.

According to the second embodiment described above, even when the person is moving, the accuracy of the masked area can be ensured periodically while the person in the projection path may not suffer the glare.

Further, though the case in which the image signal combining unit 18 selects the displayed image during the frame period when the capture is permitted (when the displayed image is not changed) or the image on which the masked image is superimposed during the frame period when the capture is prohibited (when the displayed image is masked) as the image to be projected has been described in the second embodiment, an image in which the intensity level of an area corresponding to the person area is reduced may be selected during the frame period when the capture is permitted. In this case, in a manner similar to the first embodiment, the image comparator 15 is configured to compare the displayed area extraction image from the scaling unit 14 with the image having the reduced intensity level from the image signal combining unit 18.

Next, a third embodiment of the present invention will be described with reference to FIG. 4. Here, elements having reference numerals identical to those described in the first embodiment have substantially similar features, description of which will be, therefore, omitted.

In FIG. 4, there are shown an infrared camera 23 and a person area detector 22. Here, infrared light is split from the light source 19 and projected through the projection lens 2 or infrared light is generated from a separate light source that is not shown and projected onto the screen. Further, the infrared light projected onto the screen may conform to the image display area substantially.

According to this configuration, the infrared camera 23 catches the light reflected from the person standing in the projection path 3 with the infrared light reflected from the screen 4 and conveys the information to the camera interface 12. The person area detector 22 extracts the background area and the person area from the captured image based on, for example, the difference in an amount of reflection. At this time, the information about the magnification of the projection lens 2 is supplied to the projection area detector 13 so as to determine the projected area on the screen.

According to the third embodiment described above, it is possible to extract the person with high accuracy and without dependence on the displayed image information and, further, cost reduction can be implemented easily because the infrared light can be obtained by splitting it from the white light source.

Next, a fourth embodiment of the present invention will be described with reference to FIG. 5. Here, elements having reference numerals identical to those described in the first and third embodiments have substantially similar features, description of which will be, therefore, omitted.

In FIG. 5, there is shown a thermo-camera 24. Here, the light source is similar to the one in FIG. 2.

According to this configuration, the thermo-camera 24 senses the distribution of the temperature emitted from the person standing in the projection path and the distribution of the temperature emitted from the screen 4 and conveys the information to the camera interface 12. The person area detector 22 extracts the background area and the person area from the captured image based on the difference in the temperature distribution. At this time, the information about the magnification of the projection lens 2 is supplied to the projection area detector 13 so as to determine the projected area on the screen.

According to the fourth embodiment described above, the image display apparatus with high accuracy can be implemented without dependence on the displayed image information.

As described above, according to the present invention, even when the person turns his/her face in the direction of the light projected from the projector, an amount of the light entering into the eyes can be reduced.

What is claimed is:

1. A projector type display apparatus for applying light from a light source to a reflecting type picture display device and projecting outgoing light from said reflecting type picture display device by a projection lens comprising:
   a video processor which generates a display picture information;
   a camera interface which takes in a captured image captured by a camera and outputs as captured image information;
   an image size controller which outputs an area determined as a projected image as a displayed area extraction image;
   an image comparator which generates disagreement information at least in a part of a person area by comparing the image information of the displayed area extraction image with the information of projected combined image;
   a difference area generator which generates differential area information based on the disagreement information;
   a mask image generator which generates masked image information based on the differential area information; and
   an image signal combining unit which superposes the masked image information on the displayed image information and outputs the displayed image information as the information of newly projected combined image information.

2. The projector type display apparatus according to claim 1, wherein said light source is a laser diode.

3. The projector type display apparatus according to claim 1, wherein said displayed image information is said combined image information.

4. The projector type display apparatus according to claim 1, wherein said image size controller controls and changes the captured image information into a predetermined image size.

5. The projector type display apparatus according to claim 1, wherein said image size controller performs trapezoidal correction.

6. The projector type display apparatus according to claim 1, wherein said image comparator generates said disagreement information in entire area of said person area.

7. The projector type display apparatus according to claim 1, wherein said image comparator generates said disagreement information in a particular shape area of said person area.

8. A projector type display apparatus for applying red laser from a red laser producing laser diode, green laser from a green laser producing laser diode and blue laser from a blue laser producing laser diode to a reflecting type picture display device and projecting outgoing light from said reflecting type picture display device by a projection lens comprising:
   a video processor which generates a display picture information;
   a camera interface which takes in a captured image captured by a camera and outputs as captured image information;
   an image size controller which outputs an area determined as a projected image as a displayed area extraction image;
   an image comparator which generates disagreement information at least in a part of a person area by comparing the image information of the displayed area extraction image with the information of projected combined image;
   a difference area generator which generates differential area information based on the disagreement information;
   a mask image generator which generates masked image information based on the differential area information; and
   an image signal combining unit which superposes the masked image information on the displayed image information and outputs the displayed image information as the information of newly projected combined image information.

9. The projector type display apparatus according to claim 8, wherein said displayed image information is said combined image information.

10. The projector type display apparatus according to claim 8, wherein said image size controller controls and changes the captured image information into a predetermined image size.

11. The projector type display apparatus according to claim 8, wherein said image size controller performs trapezoidal correction.

12. The projector type display apparatus according to claim 8, wherein said image comparator generates said disagreement information in entire are of said person area.

13. The projector type display apparatus according to claim 8, wherein said image comparator generates said disagreement information in a particular shape area of said person area.

14. A projector type display apparatus for applying red light from a red light source, green light from a green light source and blue light from a blue light source to a plurality of penetrating type picture display devices arranged corresponding to said red light, said green light and said blue light and combining light from a plurality of said penetrating type picture display devices and projecting said combined light by a projection lens comprising:
 a video processor which generates a display picture information;
 a camera interface which takes in a captured image captured by a camera and outputs as captured image information;
 an image size controller which outputs an area determined as a projected image as a displayed area extraction image;
 an image comparator which generates disagreement information at least in a part of a person area by comparing the image information of the displayed area extraction image with the information of projected combined image;
 a difference area generator which generates differential area information based on the disagreement information;
 a mask image generator which generates masked image information based on the differential area information; and
 an image signal combining unit which superposes the masked image information on the displayed image information and outputs the displayed image information as the information of newly projected combined image information.

15. The projector type display apparatus according to claim 14, wherein each of said red light source, said green light source and said blue light source is a laser diode.

16. The projector type display apparatus according to claim 14, wherein said displayed image information is said combined image information.

17. The projector type display apparatus according to claim 14, wherein said image size controller controls and changes the captured image information into a predetermined image size.

18. The projector type display apparatus according to claim 14, wherein said image size controller performs trapezoidal correction.

19. The projector type display apparatus according to claim 14, wherein said image comparator generates said disagreement information in entire area of said person area.

20. The projector type display apparatus according to claim 14, wherein said image comparator generates said disagreement information in a particular shape area of said person area.

* * * * *